April 29, 1969      J. R. VERJUX      3,440,912
CUTTING GUIDE NOTABLY FOR CIGARETTE MACHINES
Filed Nov. 25, 1966

INVENTOR.
JEAN ROGER VERJUX
BY Amster & Rothstein
ATTORNEYS

United States Patent Office 3,440,912
Patented Apr. 29, 1969

3,440,912
CUTTING GUIDE NOTABLY FOR
CIGARETTE MACHINES
Jean Roger, Verjux, Paris, France, assignor to Usines
Decoufle, Societe Anonyme, Paris, France, a French
company
Filed Nov. 25, 1966, Ser. No. 596,839
Claims priority, application France, Nov. 29, 1965,
40,114
Int. Cl. B23d 25/02; B26d 1/56
U.S. Cl. 83—310                                    1 Claim

ABSTRACT OF THE DISCLOSURE

A cutting guide for cigarette making machines which travels along a circular path while remaining constantly oriented with respect to a moving tobacco rod. The guide is secured to a first pinion having its shaft rotatively mounted in a case II which is adjustably fastened to a rotary plate. The plate shaft is rotatively mounted around a fixed axis to which is secured a second pinion having the same diameter as the first pinion with both pinions meshing with a planet pinion having its eccentric shaft secured to the plate and rotatably driven with said plate around the axis. By moving the case II on the plate the eccentricity of the first axis of the first pinion is modified with respect to the axis of the second pinion, thus providing for cuts of various lengths.

---

The present invention relates to machines designed for the production of a continuous rod, for example cigarette-making machines, wherein the product, for example tobacco, is wrapped in a continuous tape, a paper tape in the case of cigarette machines, unrolled in the direction of, and at the same speed as, the rod.

The tape closed on itself is then glued edge to edge, as a rule, and successively cut into equal sections, for example cigarettes, by means of a suitable cutter. The output of these machines has steadily increased with time and is now several thousand cigarettes per minute.

The quality of the cutting must meet a number of requirements, notably the necessity of making the cut at right angles to the rod axis; furthermore, throughout the cutting operation the cutting tool must move in unison with the rod; finally, a clean cut is obtained only if the cutter blade is properly guided during the cutting movement by a pair of closely spaced faces called cutting guides.

These cutting guides must accompany the blade and therefore move at the same speed as the rod. Many devices have already been proposed to meet this spaced requirement.

The most conventional device of this type is reciprocated by a link or connecting-rod driven from the eccentric crankpin of a plate or disk.

As the machines, for example cigarette-making machines, must be capable of cutting products having different lengths, in devices of this type the speed of the cutting guides is adjusted by regulating the eccentric position of said crankpin.

Other systems utilizing a chain or plate carrying a series of cutting guides which are necessarily open, i.e. consisting for example of half-cylinders and revolving at a tangential speed equal to the feed speed of the rod to be cut, have been proposed to avoid the inconveniences of reciprocating apparatus.

It is the object of the present invention to avoid the inconveniences characterizing reciprocating apparatus, and also to avoid the substantial drawbacks characterizing continuous systems of the chain or plate type.

In fact, the changes in the length of the cut sections require substantial mechanical modifications, since the plate or chain must comprise a whole number of gaps or links of a length corresponding to that of the element or section to be cut.

Therefore, the number of plates or chains must correspond to the number of sections to be obtained, this inconvenience being further attended by the necessity of modifying the position of the axes of the plate or of the chain sprockets since the plate or chain must constantly be tangent to the rod.

With the device of this invention the adjustments can be made without resorting to complicated mechanical modifications or replacement of component elements, and in addition it permits of making cuts of any desired lengths.

To this end, the cutting guide according to the invention, which is adapted to travel along a circular path while remaining constantly parallel to itself and at right angles to the tobacco rod at a tangential speed equal to the rod speed, is characterized in that it is secured to a first rotary pinion having its shaft carried by the bottom of a case adapted to be secured in any suitable position to a rotary plate rotatably driven at a predetermined speed, said rotary plate being solid with a concentric shaft held in a constantly fixed position, said plate shaft having fixedly secured thereto a second pinion similar to the aforesaid first rotary pinion, both pinions being in meshing engagement with a third pinion constituting a planet pinion having its eccentric shaft rotatably driven from said plate, the aforesaid case being so movable with respect to said plate that said first pinion is in constant meshing engagement with said planet pinion or, in other words, said case can pivot about an axis coincident with that of said planet pinion to vary the eccentricity of the axis of said first pinion with respect to the axis of the second pinion.

As the first and second pinions are identical and in constant meshing engagement with said planet pinion, no relative angular movement takes place between said first and second pinions; besides, as the second pinion is fixed, the first one is also fixed and the cutting guide secured to said first pinion is thus constantly parallel to itself; on the other hand, by moving the case on the plate it is possible to modify the eccentricity of the axis of the first pinion with respect to the axis of the second pinion.

A first adjustment consists in rotating the plate at a speed such that when it performs a complete revolution the rod has been fed by a length corresponding to one cigarette; therefore, if $l$ is this cigarette length and $e$ the eccentricity or throw of the first pinion, the following equality: $l=2\times e$ is required for causing the tangential speed of the cutting guide to be equal to the feed speed of the rod. Under these conditions, a second adjustment consists in so adapting the eccentricity or throw of the first pinion that it will become equal to $e$ consistent with the above-given equality.

In order to afford a clearer understanding of this invention and of the manner in which the same may be carried out in practice, reference will now be made to the accompanying drawing illustrating diagrammatically by way of example a typical form of embodiment of the invention. In the drawing.

Figure 1:
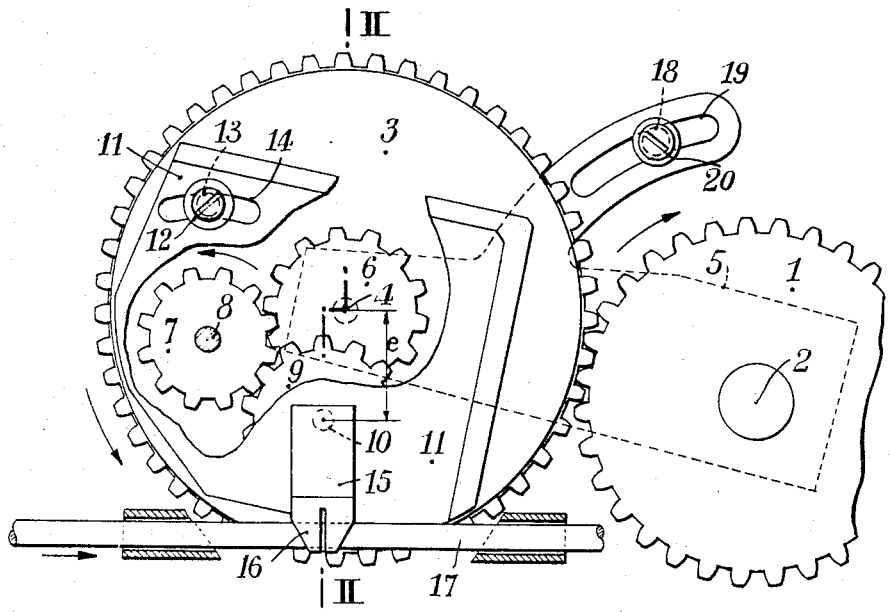
FIGURE 1 is an elevational view with parts broken away.
Figure 2:
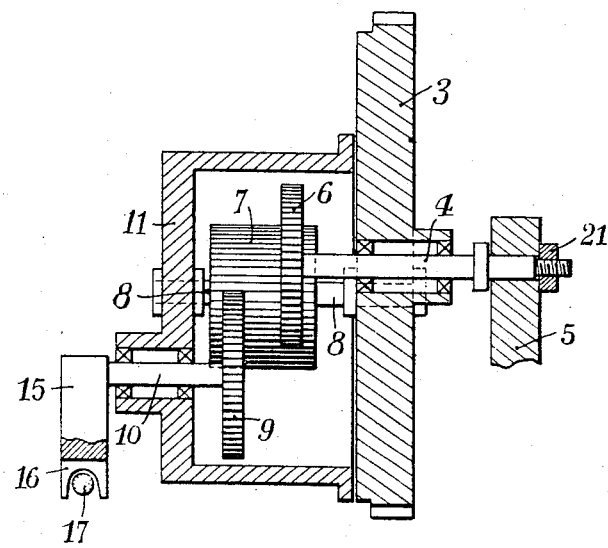
FIGURE 2 is a section taken upon the broken line II—II of FIGURE 1.

The pinion 1 having its shaft 2 fixed with respect to the main frame structure of the machine (not shown) drives a plate 3 adapted to rotate freely about its shaft 4, these shafts 2 and 4 being mounted in a common support 5.

Shaft 4 carries at one end a pinion 6 fixed with respect to the frame 5.

A planet pinion 7 revolving freely about its shaft 8 fixed in relation to said plate 3 is in meshing engagement with a pinion 9 having the same characteristics as pinion 6. The shaft 10 of pinion 9 is carried by a case 11 rotatably mounted about an extension of shaft 8 and adapted to be locked on the aforesaid plate 3 in various adjustment positions such that the pinion 9 rotates on the planet pinion 7, the relative locking condition being obtained by means of a bolt 12 engaging the screw-threaded end of a rod 13 extending through a curved slot 14 concentric to the axis of shaft 8 and formed to this end in the case 11.

Therefore, the distance between centers 4 and 10 is adjustable.

Both pinions 6 and 9 have the same characteristics, i.e. the same number of teeth and modulus, and are interconnected by a common intermediate pinion, namely ahe planet pinion 7, so that no relative motion takes place therebetween. As pinion 6 is held against movement, pinion 9 cannot revolve about its axis; all the points of this pinion 9 and therefore of member 15 rigid therewith describe circles having a radius $e$ obtained by translation with respect to one another.

The open-type cutting guides 16 secured to member 15 are thus moved parallel to themselves.

Pinion 1 drives plate 3 in such a manner that the latter performs a complete revolution each time a section, for example a cigarette, is cut. The same applies therefore to the case 11, member 15 and cutting guide 16.

As already explained hereinabove, the speeds of the cutting guide 16 and rod 17 are equal when $l$ (the cigarette length) and $e$ (eccentricity of the axis of shaft 10 with respect to that of shaft 4) are in the following relationship:

$$2\pi e = l$$

Thus, assuming for example that the rod 17 is horizontal and the cutting guide disposed above it, and that the cutting operation proper is to take place when the cutting guide 16 is in its lowermost position tangent with the rod 17, if the length $l$ of the cigarette to be cut varies, the throw $e$ of pinion 9 must be varied and under these conditions the frame 5 is also rotated about its axis 2 in order properly to replace the cutting guide, this adjustment being possible due to the provision of a screw-threaded rod 18 solid with the machine which extends through a curved slot 19 concentric with the axis of shaft 2 provided to this end in the frame 5, a bolt 20 permitting of locking the frame 5 in any desired angular position.

This rotation obviously modifies the angular setting of the cutting guide which was vertical as a consequence of the initial adjustment; the proper setting of the cutting guide is restored without difficulty by releasing the bolt 21 and therefore the shaft 4 with respect to the frame 5 and by slightly rotating the pinion 6 in the proper direction, whereby the pinions are rotated as a unitary structure together with the cutting guide through a same angle; then shaft 4 is locked again on the frame 5.

Of course, the forms of embodiment described hereinabove with reference to the drawing should not be construed as limiting the invention since many modifications may be brought thereto without departing from the spirit and scope of the invention as set forth in the appended claims.

What I claim is:

1. A device for controlling a cutting guide for machines manufacturing continuous rods, notably cigarette manufacturing machines, wherein said guide is adapted to follow a circular path while remaining constantly parallel to itself and perpendicular to the tobacco rod, at a tangential speed equal to the linear speed of said rod, said device comprising a first rotary pinion, a shaft, to which said cutting guide is secured, a rotary plate adapted to be rotatably driven at a predetermined speed, a case connected to said rotary plate and carrying the shaft of said first rotary pinion, a fixed axis about which said rotary plate and said case are adapted to revolve together, a second pinion similar to said first pinion which is secured to said shaft and remains fixed, a third pinion acting as a planet pinion, an eccentric shaft on which said planet pinion is mounted rotatably driven from said plate, and an adjustable connection between said case and said plate, so that said case can pivot about an axis coincident with that of said planet pinion and may be secured to said rotary plate in any desired angular position, said first pinion remaining in constant meshing engagement with said planet pinion.

References Cited

UNITED STATES PATENTS

| | | | |
|---|---|---|---|
| 1,140,392 | 5/1915 | Novick | 83—328 X |
| 1,989,012 | 1/1935 | Kalko | 83—328 |
| 2,157,000 | 5/1939 | Morgan et al. | 83—328 |

JAMES M. MEISTER, *Primary Examiner.*

U.S. Cl. X.R.

83—327